(12) United States Patent
Hibara et al.

(10) Patent No.: US 11,262,720 B2
(45) Date of Patent: Mar. 1, 2022

(54) COMMUNICATION DEVICE, COMMUNICATION ADAPTOR, COMMUNICATION SYSTEM, COMMUNICATION PARAMETER RESPONSE METHOD, AND PROGRAM

(71) Applicant: Mitsubishi Electric Corporation, Tokyo (JP)

(72) Inventors: Naoyuki Hibara, Tokyo (JP); Satoshi Minezawa, Tokyo (JP); Masaaki Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/509,827

(22) Filed: Jul. 12, 2019

(65) Prior Publication Data

US 2019/0332078 A1 Oct. 31, 2019

Related U.S. Application Data

(62) Division of application No. 15/511,869, filed as application No. PCT/JP2014/081577 on Nov. 28, 2014, now Pat. No. 10,459,414.

(51) Int. Cl.
*G05B 19/042* (2006.01)
*G08C 17/02* (2006.01)
*G05B 13/02* (2006.01)

(52) U.S. Cl.
CPC ..... *G05B 19/0423* (2013.01); *G05B 13/0265* (2013.01); *G08C 17/02* (2013.01);
(Continued)

(58) Field of Classification Search
CPC ............ G05B 19/0423; G05B 13/0265; G05B 2219/23269; G08C 17/02; G08C 2201/50; H04Q 9/00
See application file for complete search history.

(56) References Cited

U.S. PATENT DOCUMENTS 6,910,221 B1 * 6/2005 Honda ................... H04H 20/12
725/116
10,530,700 B2 * 1/2020 Ho ........................ H04L 47/127
(Continued)

FOREIGN PATENT DOCUMENTS

CN 101784060 A 7/2010
CN 102724051 A 10/2012
(Continued)

OTHER PUBLICATIONS

Combining a Multi-Agent System and Communication Middleware for Smart Home Control: A Universal Control Platform Architecture Song, Zheng; Zhang, Qi; Zheng, Rong; Bi-Qin, Huang; Yi-Lin, Song; et al. Sensors 17.9: 2135. Basel: MDPI AG. (2017) (Year: 2017).*

(Continued)

*Primary Examiner* — Michael Won
(74) *Attorney, Agent, or Firm* — Posz Law Group, PLC

(57) ABSTRACT

A data storage of a communication device stores a communication parameter. A communication parameter responder of a controller, upon receipt from a control device, via a communicator, of a communication parameter request-command indicating a communication parameter request, reads and acquires the communication parameter stored in the data storage. The communication parameter responder generates a response command containing the acquired communication parameter and sends the response command to the control device via the communicator.

10 Claims, 6 Drawing Sheets

(52) U.S. Cl.
CPC .............. *G05B 2219/23269* (2013.01); *G08C 2201/50* (2013.01)

(56) References Cited

U.S. PATENT DOCUMENTS

| | | | | |
|---|---|---|---|---|
| 10,785,713 | B2* | 9/2020 | Kim | H04W 24/08 |
| 2004/0088408 | A1* | 5/2004 | Tsyganskiy | H04L 63/1408 |
| | | | | 709/225 |
| 2005/0132103 | A1 | 6/2005 | Yagisawa et al. | |
| 2006/0085166 | A1 | 4/2006 | Ochi et al. | |
| 2006/0154631 | A1* | 7/2006 | Nakano | H04L 63/061 |
| | | | | 455/181.1 |
| 2006/0168236 | A1 | 7/2006 | Higuma et al. | |
| 2007/0026845 | A1* | 2/2007 | Nakano | H04L 12/2854 |
| | | | | 455/414.2 |
| 2007/0136303 | A1* | 6/2007 | Singhai | G06Q 10/10 |
| 2007/0268958 | A1* | 11/2007 | Oda | H04L 43/00 |
| | | | | 375/130 |
| 2008/0046558 | A1 | 2/2008 | Raja et al. | |
| 2008/0054821 | A1* | 3/2008 | Busby | H05B 47/22 |
| | | | | 315/291 |
| 2008/0071939 | A1 | 3/2008 | Tanaka et al. | |
| 2009/0010642 | A1* | 1/2009 | Sui | H04B 10/0793 |
| | | | | 398/9 |
| 2009/0092042 | A1* | 4/2009 | Yuhara | H04L 41/08 |
| | | | | 370/216 |
| 2010/0315964 | A1* | 12/2010 | Kim | H04W 24/10 |
| | | | | 370/252 |
| 2011/0289176 | A1 | 11/2011 | Toyama | |
| 2012/0146771 | A1* | 6/2012 | Shimura | G06K 7/10297 |
| | | | | 340/10.4 |
| 2013/0091245 | A1 | 4/2013 | Miyashita | |
| 2013/0246613 | A1 | 9/2013 | Kawaba et al. | |
| 2014/0237110 | A1 | 8/2014 | Nakanishi et al. | |
| 2015/0036573 | A1* | 2/2015 | Malik | G08C 17/02 |
| | | | | 370/311 |
| 2015/0043461 | A1 | 2/2015 | Sachs et al. | |
| 2015/0286470 | A1* | 10/2015 | Dahan | G06F 11/3608 |
| | | | | 717/127 |
| 2016/0085222 | A1 | 3/2016 | Yabe et al. | |
| 2017/0220013 | A1* | 8/2017 | Kudo | H04Q 9/00 |
| 2017/0357569 | A1* | 12/2017 | Reiss | G06F 11/3668 |
| 2018/0024766 | A1* | 1/2018 | Agetsuma | G06F 11/34 |
| | | | | 711/154 |
| 2019/0044831 | A1* | 2/2019 | Guim Bernat | H04L 41/5045 |
| 2019/0075474 | A1* | 3/2019 | Nishiguchi | H04W 24/08 |
| 2019/0116217 | A1* | 4/2019 | Dhanabalan | H04L 43/0835 |
| 2021/0012155 | A1* | 1/2021 | Vu | G06F 11/3055 |

FOREIGN PATENT DOCUMENTS

| | | |
|---|---|---|
| EP | 2639696 A1 | 9/2013 |
| JP | 2013-084113 A | 5/2013 |
| JP | 5538592 B1 | 5/2014 |
| WO | 2004/032425 A1 | 4/2004 |
| WO | 2011/064998 A1 | 6/2011 |
| WO | 2013/123980 A1 | 8/2013 |

OTHER PUBLICATIONS

Office Action dated Jul. 31, 2019 issued in corresponding CN patent application No. 201480083600.7 (and English translation).
Office Action dated Aug. 26, 2020, issued for the corresponding GB patent application No. 1705677.1.
Office Action dated Jan. 3, 2020, issued for the corresponding CN patent application No. 201480083600.7 and the partial machine English translation.
International Search Report of the International Searching Authority dated Feb. 17, 2015 for the corresponding International application No. PCT/JP2014/081577 (and English translation).
Office Action dated Jan. 22, 2021, issued for the corresponding GB patent application No. 1705677.1.
Office Action dated Jun. 28, 2021 issued in the corresponding DE patent application No. 112014007219.2 (and English translation).

* cited by examiner

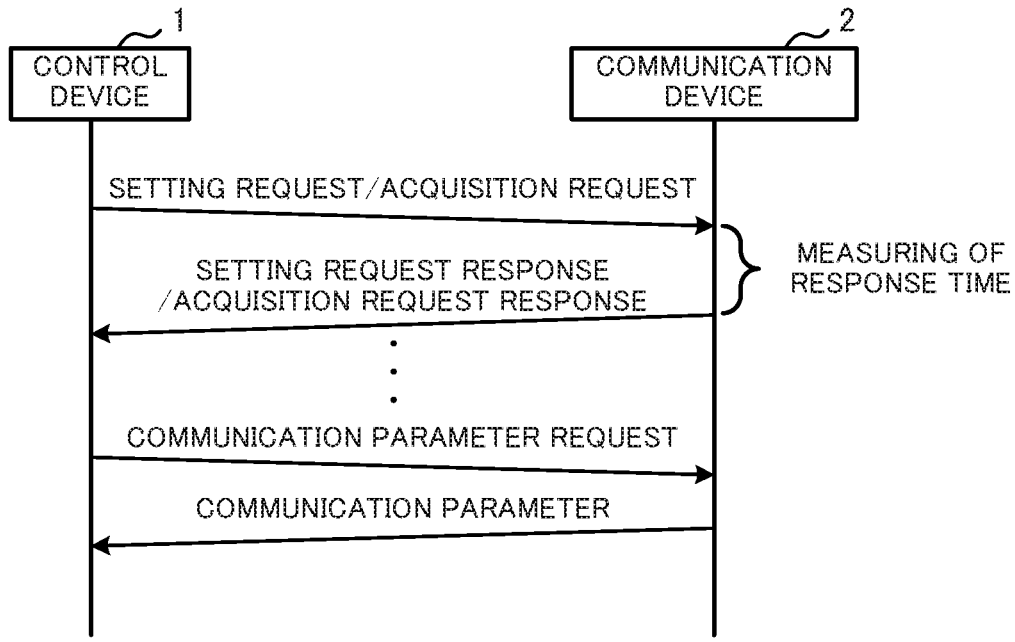
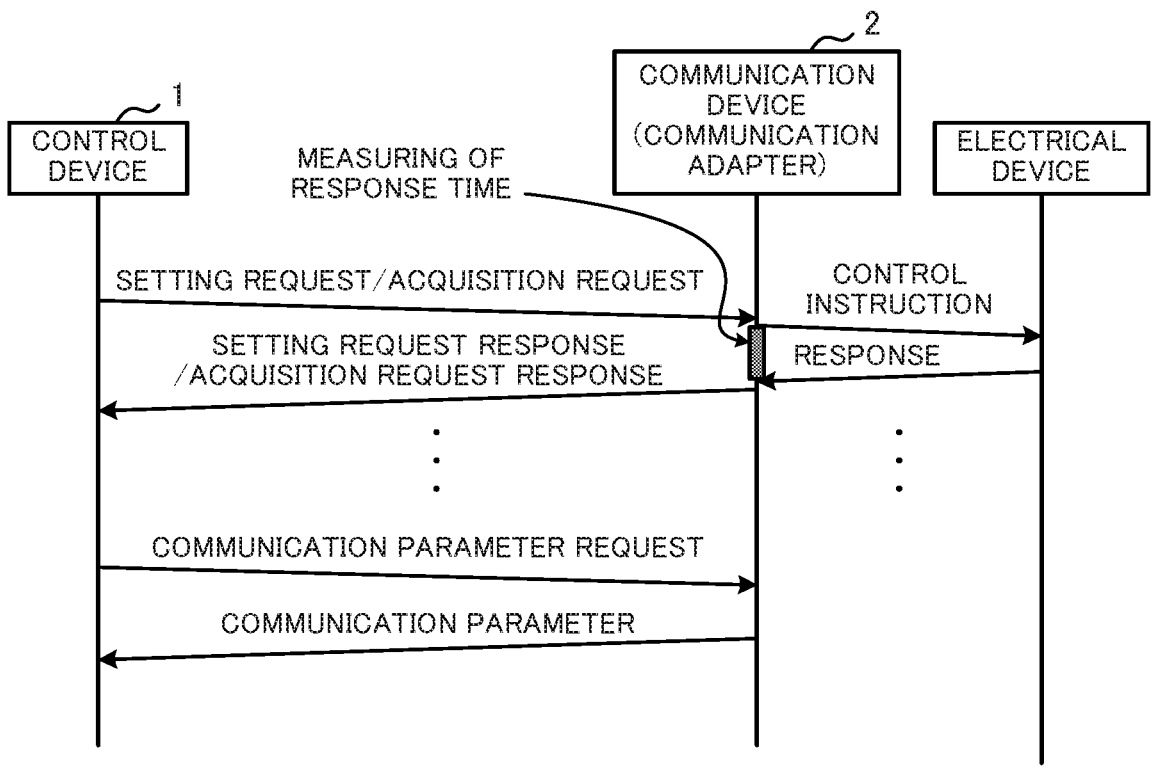

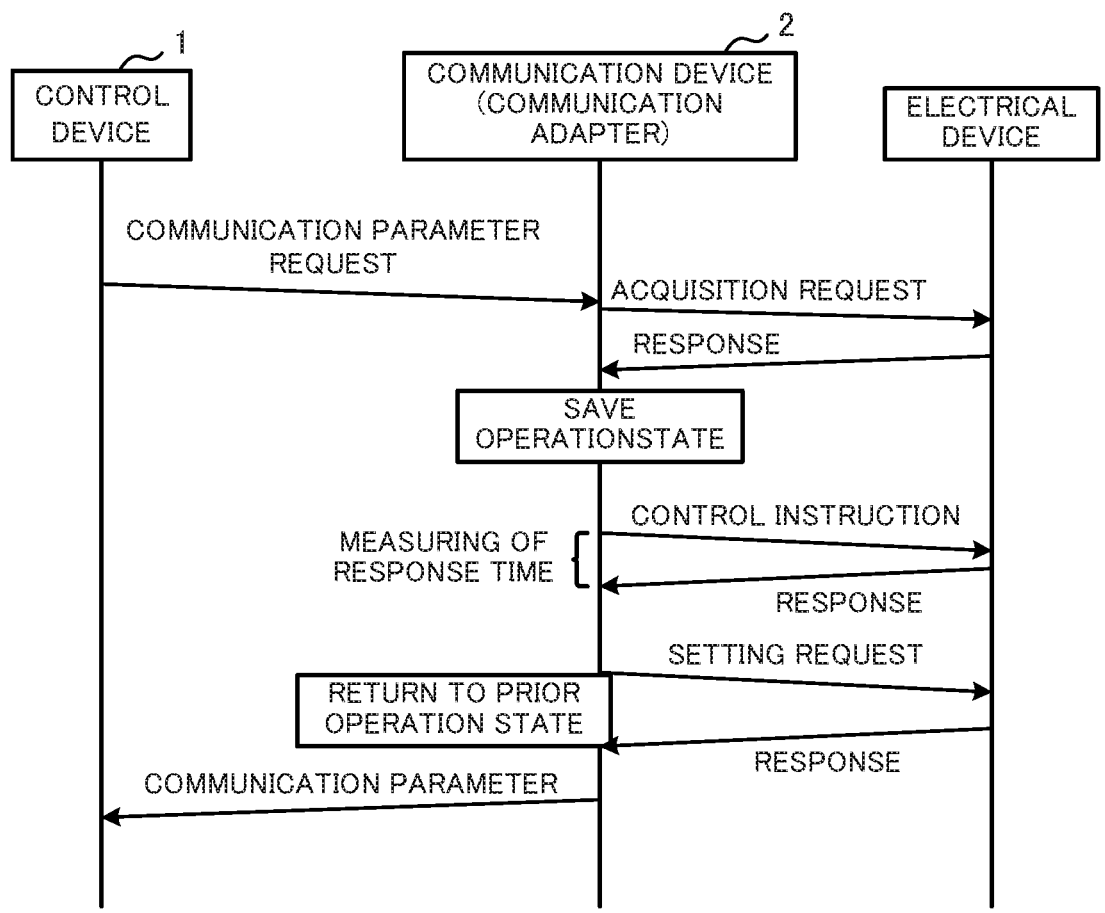

COMMUNICATION DEVICE, COMMUNICATION ADAPTOR, COMMUNICATION SYSTEM, COMMUNICATION PARAMETER RESPONSE METHOD, AND PROGRAM

CROSS REFERENCE TO RELATED APPLICATION

The present application is a divisional application of U.S. application Ser. No. 15/511,869 filed on Mar. 16, 2017, which is a U.S. national stage application of International Patent Application No. PCT/JP2014/081577 filed on Nov. 28, 2014, the contents of which are incorporated herein by reference.

TECHNICAL FIELD

The present disclosure relates to a communication device, a communication adapter, a communication system, a communication parameter response method, and a program.

BACKGROUND

There is a system known as home energy management system (HEMS) that connects communicative electrical devices to a communication network and manages the electrical devices in an integrated manner using a controller. For example, Patent Literature 1 discloses a controller that appropriately controls a device in accordance with unique circumstances of a user based on an association between devices installed in a dwelling and rooms in the dwelling and an association between the rooms in the dwelling and users.

PATENT LITERATURE

Patent Literature 1: Japanese Patent No. 5538592

However, electrical devices are manufactured by many different manufacturers and the processing capability differs from device to device. The processing capability of electrical devices can also differ depending on, for example, the type or model number. For these reasons, when performing communication with each of the electrical devices using a single designated communication specification, this might cause a drop in communication efficiency, in turn resulting in a drop in the overall processing efficiency of a system.

SUMMARY

In order to solve the aforementioned problem, an objective of the present disclosure is to provide a control device, and the like, that can realize communication using a communication specification appropriate for the control device by notifying the control device, of a communication parameter.

In order to achieve the aforementioned objective, a communication device according to the present disclosure includes:

a storage configured to store a communication parameter; and a communication parameter responder configured to, upon receipt from a control device of a communication parameter request-command indicating a communication parameter request, send to the control device, the communication parameter stored in the storage.

According to the present disclosure, the sending of a communication parameter in response to a request from the control device realizes communication using a communication specification appropriate for the control device.

BRIEF DESCRIPTION OF DRAWINGS

FIG. 10 is a diagram illustrating a communication sequence between a control device and a communication device in Embodiment 2;

FIG. 11 is a diagram illustrating a communication sequence between a control device and a communication device in a modified example of Embodiment 2;

FIG. 14 is a diagram illustrating a communication sequence between the communication device and a control device in Embodiment 4.

DETAILED DESCRIPTION

Hereinafter, embodiments of the present disclosure are described in detail with reference to the drawings.

Embodiment 1

Figure 1:
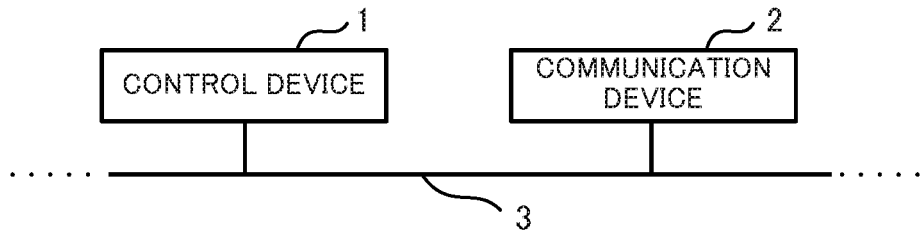
FIG. 1 is a diagram illustrating an overall configuration of a communication system according to Embodiment 1 of the present disclosure.

FIG. 1 is a diagram illustrating an overall configuration of a communication system according to Embodiment 1 of the present disclosure. This communication system includes a configuration in which a control device 1 and one or more of communication devices 2 are connected together via a network 3.

The communication device 2 is an electrical device such as a lighting fixture, an air conditioner, a refrigerator, a television, an induction heating (IH) cooker, a rice cooker, a microwave oven, a water heater, and a floor-heating system that is installed in a home (including property of the home) of an ordinary household. The communication device 2 may be a communication adapter electrically connected with such an electrical device through an interface in compliance with standardized serial communication protocol.

The network 3 is a network based on a communication protocol such as ECHONET Lite. The network 3 may be a wireless Local Area Network (LAN) or a wired LAN based on a widely-known standard, or may be a network that includes Power Line Communication (PLC).

Figure 2:
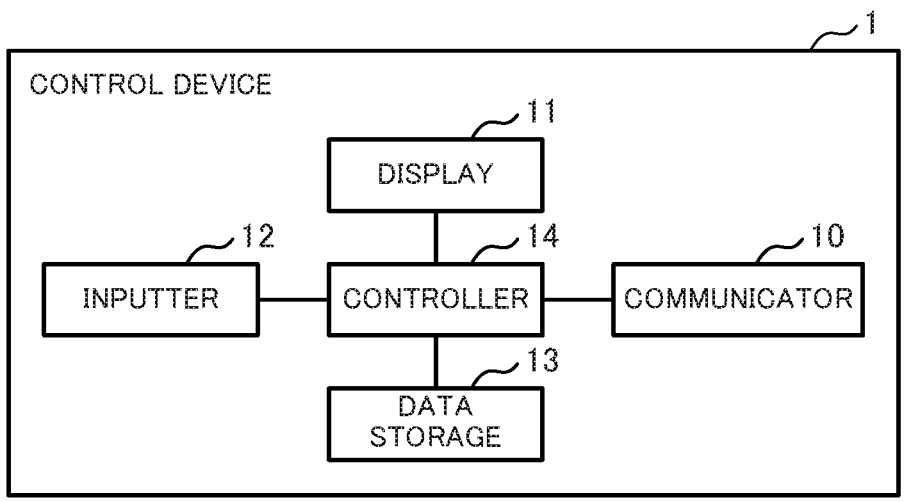
FIG. 2 is a block diagram illustrating a configuration of a control device of Embodiment 1.

The control device 1 includes, as illustrated in FIG. 2, a communicator 10, a display 11, an inputter 12, a data storage 13, and a controller 14. The communicator 10, for example, includes a communication interface such as a network card, and under control of the controller 14, performs communication with the communication device 2 via the network 3.

The display 11, for example, includes a display device such as a liquid crystal display, and under the control of the controller 14, displays screens for user operation and displays various kinds of information and the like relating to the communication device 2. The inputter 12, for example, includes an input device such as a keyboard, a mouse, a keypad, a touchpad, and a touch panel, and after accepting an input operation from the user, sends a signal in accordance with the accepted input operation to the controller 14. The data storage 13, for example, includes a readable/writable nonvolatile semiconductor memory such as a flash memory, and a hard disk drive. The data storage 13 stores various types of programs for controlling the communication device 2 and also stores data used during execution of such programs.

The controller 14 includes a central processing unit (CPU), read-only memory (ROM), random access memory (RAM), and the like (all not illustrated), and controls operation of the communication device 2 together with performing overall control of the constituent components of the control device 1.

Figure 3:
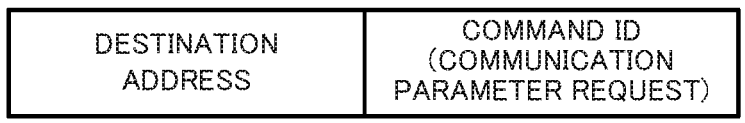
FIG. 3 is a diagram illustrating a frame format of a communication parameter request-command.

The control device 1 that includes the aforementioned components sends to the communication device 2 at a predetermined timing (for example, when connection of the communication device 2 to the network 3 is detected) a command (communication parameter request-command) indicating a communication parameter request. FIG. 3 illustrates a frame format of the communication parameter request-command. As illustrated in FIG. 3, the communication parameter request-command includes a destination address and a command identification (ID).

Here, the communication parameter of the communication device 2 refers to, for example, an amount of time (response time) that elapses from when a processing request is received by the communication device 2 until the communication device 2 returns a response, a maximum data size of a command (a single frame) processable by the communication device 2, the maximum pieces of data (number of properties) included in the command (the single frame) processable by the communication device 2, and the like.

Figure 4:
FIG. 4 is a diagram illustrating a frame format of a communication parameter response-command.

The communication device 2 that received the communication parameter request-command sends to the control device 1 a response command (communication parameter response-command) containing the communication parameter of the communication device 2. FIG. 4 illustrates a frame format of the communication parameter response-command.

The control device 1, upon receipt of the aforementioned communication parameter response-command from the communication device 2, determines the specification, such as a receipt timeout, a command retransmission interval, and the like used for communication with the communication device 2, based on the communication parameter stored in the received communication parameter response-command.

Figure 5:
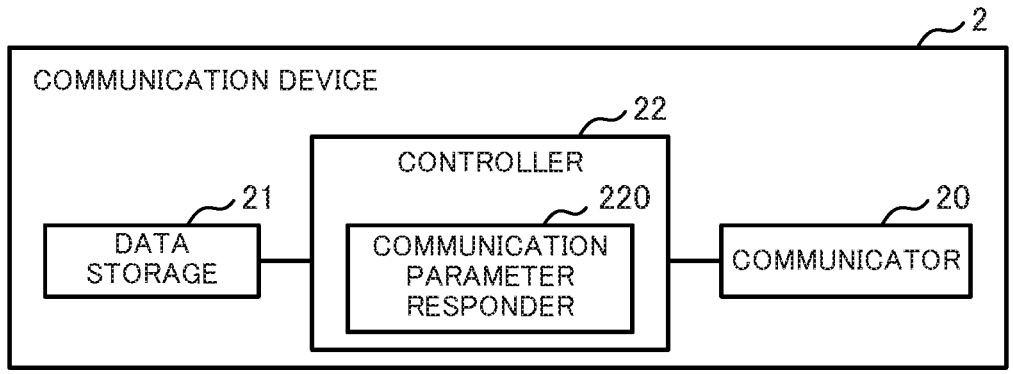
FIG. 5 is a block diagram illustrating a configuration of a communication device of Embodiment 1.

The communication device 2, as illustrated in FIG. 5, includes a communicator 20, a data storage 21, and a controller 22. When the communication device 2 is an electrical device, the communication device 2 also includes components of the electrical device (such as an air conditioner) for executing intrinsic functions (such as adjusting air temperature). Further, when the communication device 2 is a communication adapter, the communication device 2 also includes an interface for connecting to an electrical device.

The communicator 20, for example, includes a communication interface such as a network card, and under control of the controller 22, performs communication with the control device 1 or another communication device 2, via the network 3. The data storage 21, for example, includes a readable/writable nonvolatile semiconductor memory such as a flash memory, and the like. The data storage 21 stores a program for communication and data used during execution the program.

The controller 22 includes a CPU, ROM, RAM, and the like (all not illustrated), and performs overall control of the constituent components of the communication device 2. The controller 22 includes a communication parameter responder 220. The communication parameter responder 220, upon receipt of the aforementioned communication parameter request-command from the control device 1, generates a response command (communication parameter response-command) containing a communication parameter. The communication parameter responder 220 then sends the generated communication parameter response-command to the control device 1 via the communicator 20.

Figure 6:
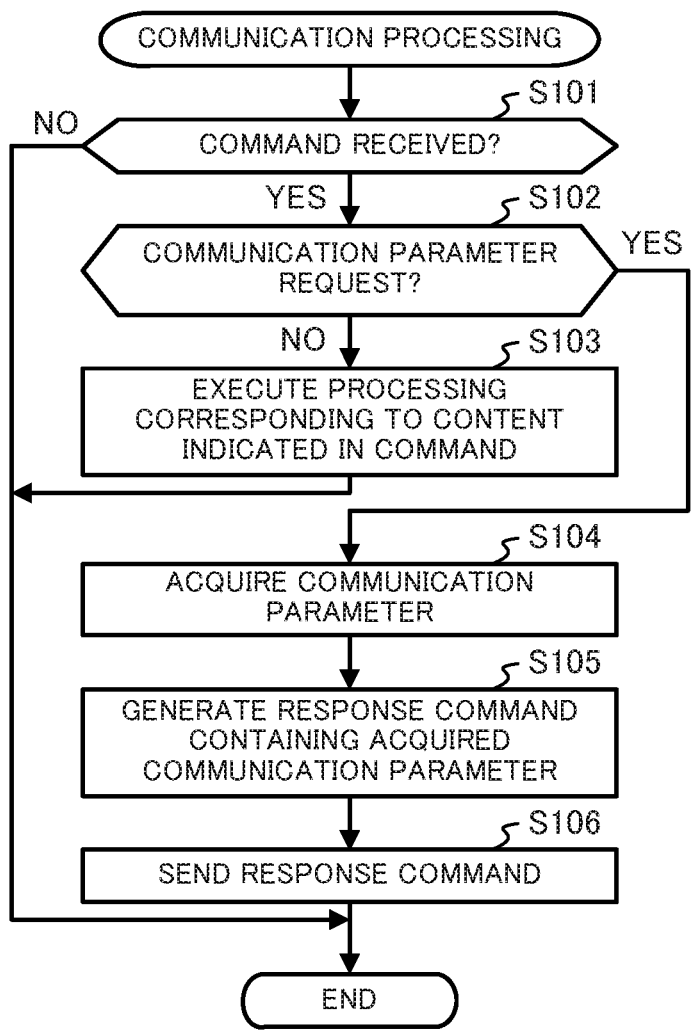
FIG. 6 is a flowchart illustrating a procedure of communication processing executed by the communication device of Embodiment 1.

FIG. 6 is a flowchart illustrating a procedure of communication processing executed by the controller 22 of the communication device 2. This communication processing is executed repeatedly at a predetermined interval.

When the command is not received from the control device 1 (step S101; NO), the controller 22 ends the current cycle of communication processing. On the other hand, when the command is received from the control device 1 (step S101; YES), yet the received command does not indicate the communication parameter request (step S102; NO), the controller 22 executes processing corresponding to the content indicated in the command (step S103) and ends the current cycle of communication processing. A command (regular command) other than the communication parameter request may be, for example, an operation parameter setting request (hereinafter simply referred to as "setting request") for changing the operation state, and a request for acquisition (hereinafter simply referred to as "acquisition request") of the operation state.

When the received command indicates a communication parameter request (step S102; YES), the communication parameter responder 220 acquires the communication parameter (step S104). More specifically, the communication parameter responder 220 acquires the communication parameter from a file containing information relating to specifications of the communication device 2 stored in the data storage 21. The communication parameter responder 220 generates a response command (communication parameter response-command) containing the acquired communication parameter (step S105). The communication parameter responder 220 then sends the generated response command to the control device 1 via the communicator 20 (step S106).

Figure 7:
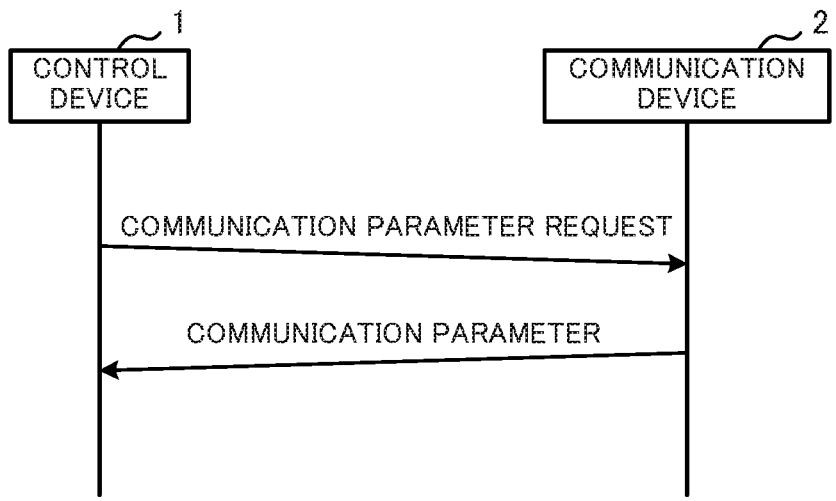
FIG. 7 is a diagram illustrating a communication sequence between the control device and the communication device in Embodiment 1.

FIG. 7 is a diagram illustrating a communication sequence relating to a communication parameter request and response between the control device 1 and the communication device 2.

As described above, the communication device 2 of the communication system of the present embodiment, upon receipt from the control device 1 of the command indicating a communication parameter request, sends to the control device 1 the response command containing its own communication parameter. The control device 1 can therefore appropriately set the specification, such as the receipt timeout, the command retransmission interval, and the like used for communication with the communication device 2.

If the communication device 2 has individually stored a communication parameter (communication parameter A) corresponding with the setting request from the control device 1 and a communication parameter (communication parameter B) corresponding with the acquisition request from the control device 1, the communication device 2 may respond using the communication parameter A and the communication parameter B when a communication parameter request(s) is/are received from the control device 1. When doing so, the communication parameter A and the communication parameter B may be stored together in a single response command or may be stored separately in different response commands.

Such kinds of configurations enable the control device 1 to appropriately change the receipt timeout, the command retransmission interval, or the like in accordance with the content of the requested command, in other words, in accordance with the setting request or in accordance with the acquisition request.

Further, in the aforementioned situation, the control device 1 may include information in the communication parameter request-command specifying whether the request is for communication parameter A or communication parameter B.

Further, since there are often cases in which a command (frame) indicating the setting request and/or the acquisition request from the control device 1 includes multiple pieces of data (properties), the communication device 2 may save a communication parameter (second communication parameter) corresponding to such cases and may respond to the control device 1. The second communication parameter, in such a case, includes, for example, a common response time necessary for each command and a response time per piece of data (property) included in the command. Furthermore, if the communication device 2 has individually stored a second communication parameter A corresponding to the setting request and a second communication parameter B corresponding to the acquisition request, the communication device 2 may respond using the second communication parameter A and the second communication parameter B when a communication parameter request-command(s) is/are received from the control device 1.

Figure 8:
FIG. 8 is a diagram illustrating a frame format of a communication parameter request-command in a modified example of Embodiment 1.

Moreover, the communication parameter may be further segmentalized and saved by the communication device 2. That is, the communication device 2 may also save the communication parameter by data ID and by data rather than just by the command ID of the setting request, the acquisition request, and/or the like. In such as case, the command from the control device 1 also contains a detailed data item, as illustrated in FIG. 8.

Embodiment 2

Next, a communication system according to Embodiment 2 of the present disclosure is described. In the following description, constituent components that are in common with Embodiment 1 are assigned the same reference numerals, and description of these components is omitted.

Figure 9:
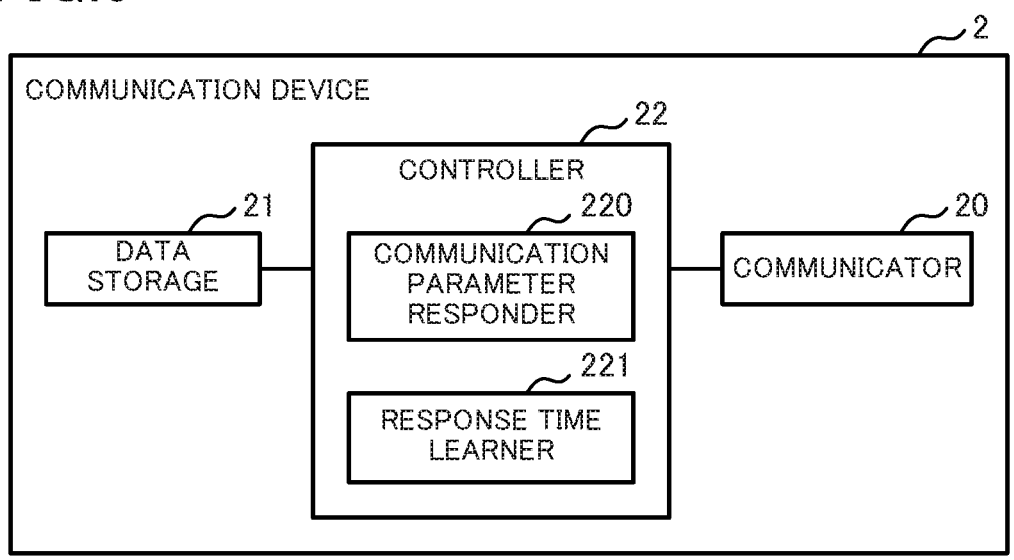
FIG. 9 is a block diagram illustrating a configuration of a communication device according to Embodiment 2 of the present disclosure.

FIG. 9 is a block diagram illustrating a configuration of the communication device 2 of Embodiment 2. As compared with the communication device 2 in Embodiment 1, a response time learner 221 is added to the controller 22 in the communication device 2 of the present embodiment.

The response time learner 221, upon receipt from the control device 1 of a regular command such as the operation parameter setting request "setting request" for changing the operation state, the request for acquisition "acquisition request" of the operation state, and the like, learns by measuring the amount of time that elapses until a response command is sent in response to the regular command, in other words, the amount of time that elapses until the response is completed (response time) (refer to FIG. 10). The response time learner 221 saves the learned results, as a communication parameter, to the data storage 21.

The communication parameter responder 220, upon receipt of the communication parameter request-command from the control device 1, generates a response command (communication parameter response-command) containing the communication parameter that is saved in the data storage 21. The communication parameter responder 220 then sends the generated communication parameter response-command to the control device 1 via the communicator 20.

In this manner, the communication device 2 of the present embodiment sends to the control device 1 the communication parameter based on an actually-measured response time. Thus, the control device 1 can obtain an accurate communication parameter and can appropriately set the specification, such as the receipt timeout, the command retransmission interval, and the like used for communication with the communication device 2.

When the communication device 2 is a communication adapter, as illustrated in FIG. 11, the response time learner 221, upon receipt from the control device 1 of a command for the setting request or the acquisition request for example, may learn the response time by measuring the amount of time that elapses from when a control instruction corresponding to the command is sent to the connected electrical device until a response returns.

Also, the response time learner 221 may learn the response time by the setting request and the acquisition request sent from the control device 1, and may save the communication parameters corresponding to the setting request and the acquisition request to the data storage 21. Further, the response time may be learned by the number of pieces of data (number of properties) included in the command, and the communication parameters corresponding to the number of pieces of data may be saved in the data storage 21.

Embodiment 3

Next, a communication system according Embodiment 3 of the present disclosure is described. In the following description, constituent components that are in common with Embodiment 1 are assigned the same reference numerals, and description of these components is omitted.

Figure 12:
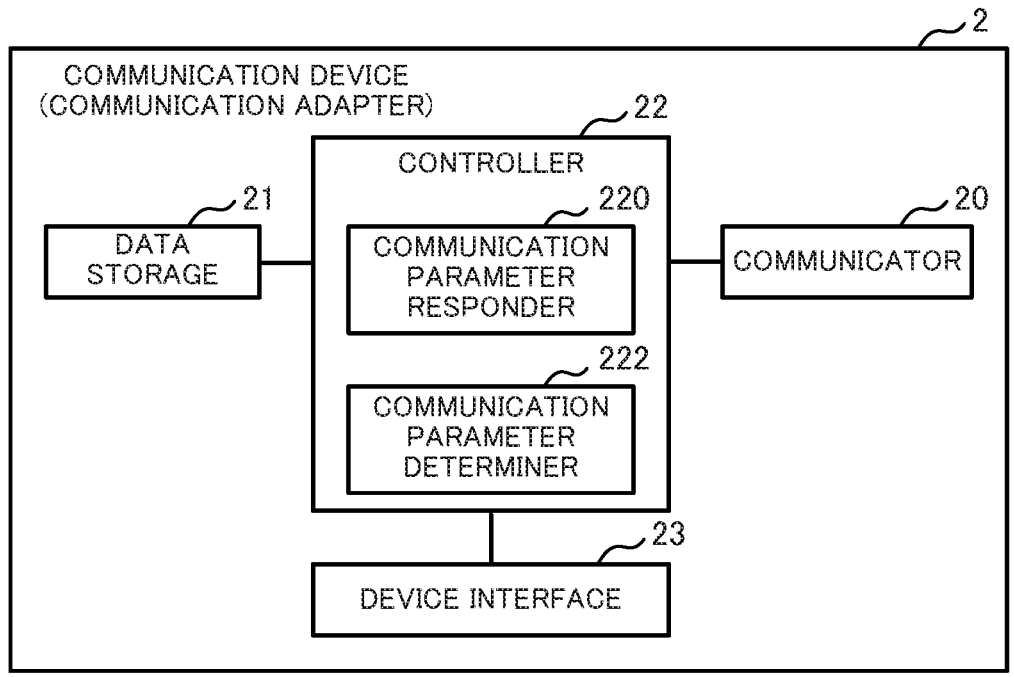
FIG. 12 is a block diagram illustrating a configuration of a communication device according to Embodiment 3 of the present disclosure.

The communication device 2 of Embodiment 3 is a communication adapter electrically connected to the electrical device through an interface in compliance with standardized serial communication protocol. As compared with the communication device 2 of Embodiment 1, the communication device 2 in the present embodiment further includes a device interface 23, and also further includes a communication parameter determiner 222 being disposed in the controller 22, as illustrated in FIG. 12.

The device interface 23 is an interface for electrically connecting the communication device 2 (communication adapter) with the electrical device.

When connection is established with the electrical device, the communication parameter determiner 222 determines, based on device information such as the type, model, or the like of the electrical device acquired from the electrical device via the device interface 23, a communication parameter to respond to the control device 1. More specifically, a data table containing multiple pieces of device information in association with at least one communication parameter is stored in the data storage 21, and the communication parameter determiner 222 determines the corresponding communication parameter by referring to the data table based on the device information acquired from the electrical device. The communication parameter determiner 222 saves the determined communication parameter to the data storage 21.

The communication device 2 (communication adapter) in the present embodiment used in this manner is versatile because the communication device 2 can be applied to various electrical devices.

Embodiment 4

Next, a communication system according Embodiment 4 of the present disclosure is described. In the following description, constituent components that are in common with Embodiment 3 are assigned the same reference numerals, and description of these components is omitted.

Figure 13:
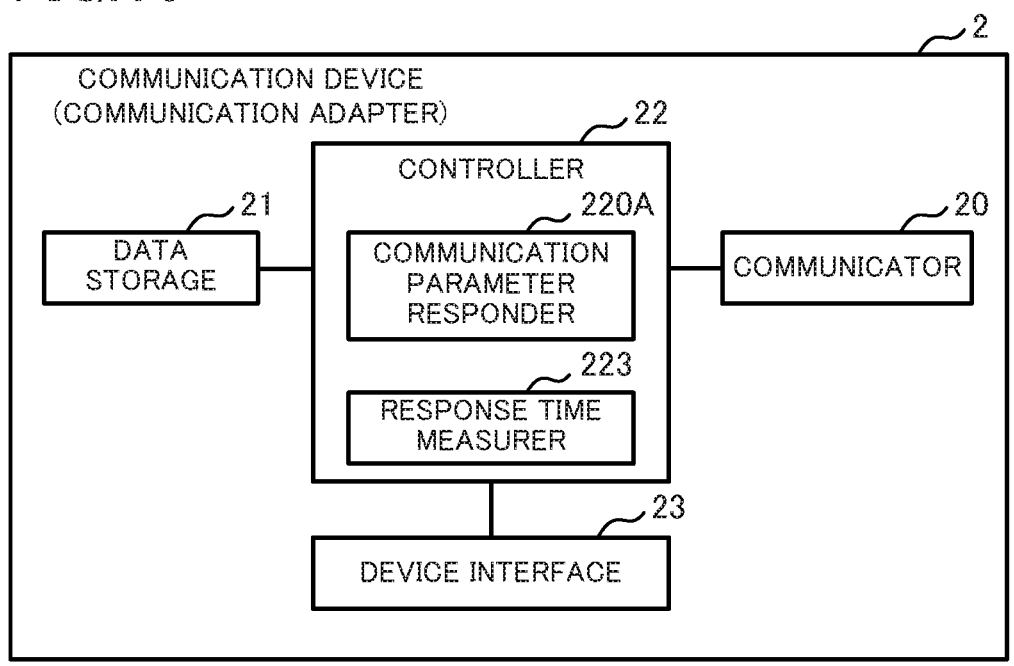
FIG. 13 is a block diagram illustrating a configuration of a communication device according to Embodiment 4 of the present disclosure.

As compared with the communication device 2 in Embodiment 3, the controller 22 of the communication device 2 in the present embodiment, as illustrated in FIG. 13, includes a communication parameter responder 220A and a response time measurer 223 instead of the communication parameter responder 220 and the communication parameter determiner 222.

As illustrated in FIG. 8, in the present embodiment, the communication parameter request-command sent from the control device 1 further includes a detailed data item.

The communication parameter responder 220A, upon receipt from the control device 1 of the communication parameter request-command, sends to an electrical device connected with the communication device 2 a control instruction (acquisition request) for acquiring the current operation state, as illustrated in FIG. 14. When data indicating the current operation state is sent by the electrical device in response to the control instruction, the communication parameter responder 220A saves the received data to the RAM.

Next, the communication parameter responder 220A sends to the electrical device a control instruction corresponding to the detailed data item of the received communication parameter request-command from the control device 1. The response time measurer 223 measures an amount of time (response time) that elapses from when the control instruction is sent to the electrical device until a response returns.

The communication parameter response 220A sends to the electrical device a command instruction (setting request) for resetting the operation state previously saved to the RAM. After doing so, the operation state of the electrical device returns to the prior state.

Then, the communication parameter responder 220A responds to the control device 1 using the response time measured by the response time measurer 223, as the communication parameter.

In this way, the communication device 2 in the present embodiment actually sends to the electrical device the control instruction corresponding to the detailed data item of the communication parameter request-command and sends to the control device 1, the amount of time the electrical device takes to respond, as the communication parameter. Therefore, the control device 1 can obtain an accurate communication parameter, and can appropriately set the specification, such as the receipt timeout, command retransmission interval, or the like used for communication with the communication device 2.

Naturally, the present disclosure is not limited the above-described embodiments, and various modifications may be made without departing from the spirit and scope of the present disclosure.

For example, in each of the aforementioned embodiments, a program for execution by the communication device 2 may be stored and distributed in a computer-readable recording medium such as a compact disc read-only memory (CD-ROM), a digital versatile disc (DVD), a magneto-optical disk (MO), a universal serial bus (USB) memory and a memory card. By installation of this program in a dedicated or general-purpose computer, the computer can function as the communication device 2 of each of the aforementioned embodiments.

The above-described program may be stored on a disk device or the like of a server device on a communication network such as the Internet to enable the program to be downloaded to the computer, for example by superimposing the program onto a carrier wave. Moreover, the aforementioned processing can be achieved even by execution while the program is transferred through the communication network. Furthermore, the aforementioned processing can be achieved by executing all or part of the program on the server device, and executing the program while sending and receiving by the computer the information relating to such processing through the communication network.

Moreover, if the aforementioned functions are executed by sharing the functions between an operating system (OS) and application programs, or are executed by both the OS and the application programs in cooperation with each other, the non-OS portion alone may be stored and distributed in the aforementioned recording medium, or alternatively, may be, for example, downloaded to the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is particularly well employed in a system that connect various electrical devices and a control device together via a network.

The invention claimed is:

1. A home appliance including a communication interface, comprising:

a storage configured to store a communication parameter corresponding to a regular command to the home appliance from a control device, the communication parameter being used for determining by the control device a specification for communication with the home appliance; and processor configured to responsive to each time the regular command is received by the home appliance from the control device, execute, at the home appliance, a processing corresponding to a home appliance operation state change or a home appliance operation state acquisition indicated in the regular command to the home appliance, learn, at the home appliance, a response time corresponding to the home appliance by measuring, in parallel with the processing, an amount of time that elapses from when the regular command is received by the home appliance until a response corresponding to the regular command is completed by the home appliance indicating that the home appliance has executed the processing corresponding to the home appliance operation state change or the home appliance operation state acquisition indicated in the regular command, and save the response time, as the communication parameter, to the storage; and upon receipt by the home appliance from the control device of a communication parameter request-command, the communication parameter request-command being any command to the home appliance other than the regular command, acquire the communication parameter stored in the storage, and send from the home appliance to the control device a communication parameter response-command containing the acquired communication parameter as a communication specification appropriate for the home appliance.

2. The home appliance according to claim 1, wherein the response time learner is further configured to learn the response time per piece of content in the regular command, and to save to the storage each response time, as the communication parameter corresponding to the each piece of content indicated by the regular command.

3. A communication system comprising:
a control device; and
the home appliance according to claim 1, wherein
upon receipt from the home appliance of the communication parameter, the control device determines, based on the communication parameter, a specification for communication with the home appliance.

4. The home appliance according to claim 1, the home appliance being an air conditioner, a refrigerator, a television, an induction heating cooker, a rice cooker, a microwave oven, a water heater, or a floor-heating system.

5. A communication adapter for connecting with a home appliance, the communication adapter comprising:
a processor configured to
responsive to each time a control instruction corresponding to a regular command is sent via the communication adapter to the home appliance, that causes the home appliance to execute, at the home appliance, a processing corresponding to a home appliance operation state change or a home appliance operation state acquisition indicated in the regular command to the home appliance, learn, at the communication adapter, a response time, in parallel with the processing, corresponding to the home appliance, by measuring an amount of time that elapses from when the control instruction is sent from the communication adapter to the home appliance until a response to the control instruction returns from the home appliance to the communication adapter indicating that the home appliance has executed the processing corresponding to the home appliance operation state change or the home appliance operation state acquisition indicated in the regular command, and save the response time, as a communication parameter for determining by a control device a specification for communication with the home appliance, to a storage; and upon receipt at the communication adapter from the control device of a communication parameter request-command, wherein the communication parameter request-command is any command to the home appliance other than the regular command, acquire the communication parameter stored in the storage, and send from the communication adapter to the control device a communication parameter response-command containing the acquired communication parameter, which is stored in the storage as a communication specification appropriate for the home appliance.

6. The communication adapter according to claim 5, the communication adapter being configured to electrically connect to the home appliance through a standardized serial communication interface, the home appliance being an air conditioner, a refrigerator, a television, an induction heating cooker, a rice cooker, a microwave oven, a water heater, or a floor-heating system.

7. A communication parameter response method comprising:

responsive to each time a regular command to a home appliance including a communication interface is received at the home appliance from a control device, executing, at the home appliance, a processing corresponding to a home appliance operation state change or a home appliance operation state acquisition indicated in the regular command to the home appliance, learning, by the home appliance, a response time corresponding to the home appliance by measuring, in parallel with the processing, an amount of time that elapses from when the regular command is received by the home appliance until a response corresponding to the regular command is completed by the home appliance indicating that the home appliance has executed the processing corresponding to the home appliance operation state change or the home appliance operation state acquisition indicated in the regular command, and saving, by the home appliance, the response time as the communication parameter to a storage; and upon receipt by the home appliance from the control device of a communication parameter request-command, the communication parameter request-command being any command to the home appliance other than the regular command, acquiring the communication parameter stored in the storage, and sending from the home appliance to the control device a communication parameter response-command containing the acquired communication parameter as a communication specification appropriate for the home appliance.

8. The communication parameter response method according to claim 7, the home appliance being an air conditioner, a refrigerator, a television, an induction heating cooker, a rice cooker, a microwave oven, a water heater, or a floor-heating system.

9. A non-transitory computer-readable recording medium storing a program configured to cause a home appliance including a communication interface to function as:

responsive to each time a regular command to a home appliance including a communication interface is received at the home appliance from a control device, executing, at the home appliance, a processing corresponding to a home appliance operation state change or a home appliance operation state acquisition indicated in the regular command to the home appliance, learning, by the home appliance, a response time corresponding to the home appliance by measuring, in parallel with the processing, an amount of time that elapses from when a regular command is received by the home appliance from the control device until a response corresponding to the regular command is completed by the home appliance indicating that the home appliance has executed the processing corresponding to the home appliance operation state change or the home appliance operation state acquisition indicated in the regular command, and saving the response time as the communication parameter to a storage; and upon receipt by the home appliance from the control device of a communication parameter request-command, the communication parameter request-command being any command to the home appliance other than the regular command, acquiring the communication parameter stored in the storage, and sending from the home appliance to the control device a communication parameter response-command containing the acquired communication parameter as a communication specification appropriate for the home appliance.

10. The non-transitory computer-readable recording medium according to claim 9, the home appliance being an air conditioner, a refrigerator, a television, an induction heating cooker, a rice cooker, a microwave oven, a water heater, or a floor-heating system.

* * * * *